(12) United States Patent  (10) Patent No.: US 8,002,183 B2
Blake et al. (45) Date of Patent: Aug. 23, 2011

(54) SCANNER FLIPPER INTEGRITY INDICATOR (75) Inventors: Robert E. Blake, Woodbury Heights, NJ (US); Donald T. Hudrick, Sicklerville, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 1339 days.

(21) Appl. No.: 11/291,492

(22) Filed: Nov. 30, 2005

(65) Prior Publication Data

US 2007/0119947 A1    May 31, 2007

Related U.S. Application Data

(60) Provisional application No. 60/728,610, filed on Oct. 20, 2005.

(51) Int. Cl.
*G06K 7/10* (2006.01)
(52) U.S. Cl. ............... 235/444; 235/462.25; 235/462.36
(58) Field of Classification Search .. 235/462.36–462.4, 235/444, 462.25, 462.32
See application file for complete search history.

(56) References Cited

U.S. PATENT DOCUMENTS

| | | | |
|---|---|---|---|
| 4,034,230 A | 7/1977 | Brill et al. | |
| 4,251,798 A | 2/1981 | Swartz et al. | |
| 4,286,145 A * | 8/1981 | Palmer | 235/462.49 |
| 4,805,175 A | 2/1989 | Knowles | |
| 5,003,164 A | 3/1991 | Barkan | |
| 5,015,831 A | 5/1991 | Eastman et al. | |
| 5,019,764 A | 5/1991 | Chang | |
| 5,059,779 A * | 10/1991 | Krichever et al. | 235/462.22 |
| 5,099,110 A | 3/1992 | Shepard et al. | |
| 5,115,120 A | 5/1992 | Eastman | |
| 5,126,545 A | 6/1992 | Barkan | |
| 5,168,149 A | 12/1992 | Dvorkis et al. | |
| 5,200,597 A | 4/1993 | Eastman et al. | |
| 5,206,492 A | 4/1993 | Shepard et al. | |
| 5,252,816 A | 10/1993 | Onimaru et al. | |
| 5,258,699 A | 11/1993 | Grodevant | |
| 5,262,627 A | 11/1993 | Shepard | |
| 5,280,163 A | 1/1994 | Barkan | |
| 5,280,165 A | 1/1994 | Dvorkis et al. | |
| 5,281,801 A | 1/1994 | Shepard et al. | |

(Continued)

FOREIGN PATENT DOCUMENTS

JP      06111046 A  *  4/1994

OTHER PUBLICATIONS

U.S. Appl. No. 11/303,860, "Scanner Flipper Oscillation Frequency Detection and Adjustment thereof" filed Dec. 16, 2005 by Blake et al.

*Primary Examiner* — Thien M Le
(74) *Attorney, Agent, or Firm* — Thomas J. Perkowski, Esp., P.C.

(57) ABSTRACT

A scanner flipper integrity checking method, computer-readable medium, and apparatus is provided. In one embodiment, the method powers a motor for a predetermined amount of time. After the predetermined time has expired a wave is received indicative of the frequency of the oscillation of the flipper. Thereafter, the method uses the wave signal to determine whether there are two consecutive transitions indicative of movement by said flipper. In another embodiment, an apparatus is also provided which performs the similar features recited by the above method.

18 Claims, 4 Drawing Sheets

U.S. PATENT DOCUMENTS

| | | |
|---|---|---|
| 5,329,103 A | 7/1994 | Rando |
| 5,367,151 A | 11/1994 | Dvorkis et al. |
| 5,412,198 A | 5/1995 | Dvorkis et al. |
| 5,420,411 A | 5/1995 | Salatto, Jr. et al. |
| 5,422,469 A | 6/1995 | Bard et al. |
| 5,422,471 A | 6/1995 | Plesko |
| 5,422,472 A | 6/1995 | Tavislan et al. |
| 5,464,976 A | 11/1995 | Scofield |
| 5,475,206 A | 12/1995 | Reddersen et al. |
| 5,479,000 A | 12/1995 | Dvorkis et al. |
| 5,484,995 A | 1/1996 | Scofield et al. |
| 5,486,944 A | 1/1996 | Bard et al. |
| 5,506,394 A | 4/1996 | Plesko et al. |
| 5,508,503 A | 4/1996 | Scofield et al. |
| 5,512,744 A | 4/1996 | Scofield et al. |
| 5,532,468 A | 7/1996 | Scofield |
| 5,532,480 A | 7/1996 | Scofield |
| 5,539,192 A | 7/1996 | Scofield et al. |
| 5,543,609 A | 8/1996 | Giordano et al. |
| 5,559,319 A | 9/1996 | Peng |
| 5,576,531 A | 11/1996 | Murphy |
| 5,581,067 A | 12/1996 | Grosfeld et al. |
| 5,581,070 A | 12/1996 | Dvorkis et al. |
| 5,583,332 A | 12/1996 | Krichever et al. |
| 5,589,679 A | 12/1996 | Dvorkis et al. |
| 5,594,232 A | 1/1997 | Giordano |
| 5,596,446 A | 1/1997 | Plesko |
| 5,598,070 A | 1/1997 | Coleman |
| 5,600,120 A | 2/1997 | Peng |
| 5,614,706 A | 3/1997 | Bard et al. |
| 5,621,371 A | 4/1997 | Dvorkis et al. |
| 5,625,483 A | 4/1997 | Swartz |
| 5,629,510 A | 5/1997 | Quinn et al. |
| 5,637,856 A | 6/1997 | Bridgelall et al. |
| 5,648,649 A | 7/1997 | Bridgelall et al. |
| 5,668,362 A | 9/1997 | Plesko |
| 5,682,029 A | 10/1997 | Dvorkis et al. |
| 5,693,929 A | 12/1997 | Dvorkis et al. |
| 5,698,835 A | 12/1997 | Dvorkis et al. |
| 5,705,799 A | 1/1998 | Li |
| 5,712,471 A | 1/1998 | Bremer |
| 5,714,750 A | 2/1998 | Eastman et al. |
| 5,723,851 A | 3/1998 | Salatto, Jr. et al. |
| 5,750,976 A | 5/1998 | Eastman et al. |
| 5,763,863 A | 6/1998 | Grosfeld et al. |
| 5,764,398 A | 6/1998 | Hayakawa |
| 5,786,585 A | 7/1998 | Eastman et al. |
| 5,796,222 A | 8/1998 | Grodevant |
| 5,804,809 A | 9/1998 | Eastman et al. |
| 5,821,521 A | 10/1998 | Bridgelall et al. |
| 5,825,013 A | 10/1998 | Dvorkis et al. |
| 5,866,894 A | 2/1999 | Bard et al. |
| 5,874,720 A | 2/1999 | Dvorkis et al. |
| 5,880,452 A | 3/1999 | Plesko |
| 5,917,173 A | 6/1999 | Dvorkis et al. |
| 5,923,025 A | 7/1999 | Dvorkis et al. |
| 5,932,860 A | 8/1999 | Plesko |
| 5,945,658 A | 8/1999 | Salatto, Jr. et al. |
| 5,945,659 A | 8/1999 | Dvorkis et al. |
| 5,955,720 A | 9/1999 | He et al. |
| 5,984,188 A | 11/1999 | Dvorkis et al. |
| 6,056,200 A | 5/2000 | Dvorkis et al. |
| 6,059,188 A | 5/2000 | diFazio et al. |
| 6,102,294 A | 8/2000 | Swartz et al. |
| 6,114,712 A | 9/2000 | Dvorkis et al. |
| 6,129,282 A | 10/2000 | Reddersen |
| 6,142,379 A | 11/2000 | Bard et al. |
| 6,149,061 A | 11/2000 | Massieu et al. |
| 6,152,372 A | 11/2000 | Colley et al. |
| 6,206,290 B1 | 3/2001 | Giebel et al. |
| 6,227,450 B1 | 5/2001 | Blake et al. |
| 6,230,976 B1 | 5/2001 | Sautter et al. |
| 6,283,372 B1 | 9/2001 | Li |
| 6,303,927 B1 | 10/2001 | Ahten et al. |
| 6,325,288 B1 | 12/2001 | Spitz |
| 6,328,216 B1 | 12/2001 | Colley et al. |
| 6,332,576 B1 | 12/2001 | Colley et al. |
| 6,334,573 B1 | 1/2002 | Li et al. |
| 6,347,744 B1 | 2/2002 | Metlitsky |
| 6,348,773 B1 | 2/2002 | Dvorkis et al. |
| 6,360,949 B1 | 3/2002 | Shepard et al. |
| 6,390,370 B1 | 5/2002 | Plesko |
| 6,439,461 B2 | 8/2002 | Dvorkis et al. |
| 6,491,222 B1 | 12/2002 | Dvorkis et al. |
| 6,527,180 B1 | 3/2003 | Dvorkis |
| 6,527,183 B2 | 3/2003 | Bard et al. |
| 6,575,370 B1 | 6/2003 | Dvorkis et al. |
| 6,585,160 B2 | 7/2003 | Dvorkis et al. |
| 6,592,040 B2 | 7/2003 | Barkan et al. |
| 6,607,132 B1 | 8/2003 | Dvorkis et al. |
| 6,612,192 B2 | 9/2003 | Hardy et al. |
| 6,612,496 B1 | 9/2003 | Barkan et al. |
| 6,621,070 B2 | 9/2003 | Ahten et al. |
| 6,641,043 B1 | 11/2003 | Plesko |
| 6,648,227 B2 | 11/2003 | Swartz et al. |
| 6,712,270 B2 | 3/2004 | Leach |
| 6,715,681 B2 | 4/2004 | Dvorkis |
| 6,722,566 B1 | 4/2004 | Drzymak et al. |
| 6,729,545 B2 | 5/2004 | Li et al. |
| 6,769,616 B2 | 8/2004 | Fu et al. |
| 6,775,077 B1 | 8/2004 | Feng |
| 6,845,915 B2 * | 1/2005 | Krichever et al. ....... 235/462.22 |
| 6,874,689 B2 | 4/2005 | Blake et al. |
| 6,884,993 B2 | 4/2005 | Ahten et al. |
| 6,929,184 B2 | 8/2005 | Barkan |
| 6,932,274 B2 | 8/2005 | Dvorkis |
| 6,969,005 B2 | 11/2005 | Otsubo |
| 7,034,370 B2 | 4/2006 | Kuo |
| 7,059,528 B2 | 6/2006 | Barkan et al. |
| 7,071,931 B2 | 7/2006 | Tegreene et al. |
| 7,182,262 B2 | 2/2007 | Wood et al. |
| 7,182,263 B2 * | 2/2007 | Li et al. ..................... 235/462.36 |
| 7,204,424 B2 | 4/2007 | Yavid et al. |
| 7,246,375 B1 * | 7/2007 | Jean et al. ........................ 726/21 |
| 7,281,658 B2 | 10/2007 | Shepard et al. |
| 7,296,750 B2 | 11/2007 | Wood et al. |
| 7,306,154 B2 | 12/2007 | Takahashi |
| 7,325,736 B2 | 2/2008 | Asai et al. |
| 2007/0119947 A1 * | 5/2007 | Blake et al. ............... 235/462.37 |
| 2008/0011846 A1 * | 1/2008 | Cato ............................ 235/435 |
| 2008/0290170 A1 * | 11/2008 | Blake et al. ................ 235/462.3 |

* cited by examiner

SCANNER FLIPPER INTEGRITY INDICATOR

This application claims benefit of U.S. Provisional Patent Application Ser. No. 60/728,610, filed Oct. 20, 2005, which is herein incorporated by reference.

BACKGROUND OF THE INVENTION

1. Field of the Invention

Embodiments of the present invention generally relate to laser scanning systems and more particularly, to checking flipper integrity in electronically-controlled damped off-resonant laser based symbol scanning mechanisms.

2. Description of the Related Art

One commonly used beam scanning technique involves driving a resonant element bearing a mirror into oscillatory motion within a plane, while a laser beam is directed incident the mirror surface. As the resonant element oscillates, so too does the mirror, causing the incident laser beam to be scanned across a scanning field of substantially planar extent, as well as a bar code symbol disposed therewithin. Some scanning mechanisms utilize strips made of MYLAR® (a mark registered with the United States Patent and Trademark Office ("U.S.P.T.O") by Dupont) or KAPTON® (a mark registered with the U.S.P.T.O. by Dupont) plastic material are used to realize resonant scanning elements.

In general, laser light reflected from the scanned bar code symbol is collected and detected to produce an electrical signal representative of the scanned symbol. Ultimately, the electrical signal is processed in order to decode the scanned symbol and produce symbol character data representative of the decoded symbol.

Because a laser is being used there are certain health concerns. For example, although the laser used is a low intensity level laser and causes no harm when placed against skin, damage can be sustained in an eye if a stationary laser beam is aimed at the eye. Specifically, the eye will attempt to focus on what it sees, and as a result, even a low intensity laser can damage the eye when viewed over a relatively short interval. In an attempt to address this concern agencies such as the Bureau of Radiological Health ("BRH") mandate that there are power limitations (that the laser must be off) within a small diameter (e.g., 7 mm).

As stated above, the resonant element (e.g., a KAPTON® based flipper) is a moving part which transmits and receives information. There are instances when the KAPTON® based flipper may fail (i.e., not transmit an oscillating laser beam) and require that the laser be turned off to prevent eye injury from a stationary beam and so that the scanning device may be examined. However there are instances when the flipper is flipping properly but an erroneous message is received that the flipper is working improperly. When an erroneous message is received the scanner is needlessly turned off.

Therefore, there is a great need in the art for an improved laser scanning mechanism which avoids the shortcomings and drawbacks of prior art laser beam scanning apparatus and methodologies.

SUMMARY OF THE INVENTION

These and other deficiencies of the prior art are addressed by the present invention which generally relates to laser scanning systems and more particularly, to checking flipper integrity in electronically-controlled damped off-resonant laser based symbol scanning mechanisms. In one embodiment, a method is provided which powers a motor for a predetermined amount of time. After the predetermined time has expired a wave is received indicative of the frequency of the oscillation of the flipper. Thereafter, the method uses the wave signal to determine whether there are two consecutive transitions indicative of movement by the flipper. The method also makes three attempts to ascertain transitions for determining that the flipper is not oscillating at a desired frequency (e.g., about 3 to 4 Hz below resonant frequency). Embodiments which encompass an apparatus and a computer-readable medium which perform functions similar to the above described method are also provided.

In another embodiment, a bar code flipper checking system which includes an optical bench and a flipping element of unitary construction having a base portion is disclosed. The base portion is anchored with respect to the optical bench so as to permit the flipping element to pivot about a fixed pivot point. The flipping element has a permanent magnet mounted on the flipping element and a desired frequency of oscillation about the fixed pivot point. A magnetic-field producing coil having a pair of input terminals is included and is disposed adjacent to the permanent magnet. The magnetic-field producing coil produces a magnetic force field of reversible polarity in the vicinity of the permanent magnet in response to an electrical current signal flowing through the magnetic-field producing coil. An electrical circuit is coupled to the pair of input terminals. The electrical circuit transmits an electrical voltage signal which causes the electrical current signal to flow through the magnetic-field producing coil and produce in the vicinity of the permanent magnet, the magnetic force field having a polarity which varies in accordance with the amplitude and frequency of the electrical current flowing through the magnetic-field producing coil. The magnetic force field interacts with the permanent magnetic and forces the flipper element to oscillate about the fixed pivot point. A pair of output terminals coupling the coil to the electrical circuit amplifies an output wave associated with the oscillation of the flipping element. Thereafter, the electrical circuit converts the amplified wave into a transistor transistor level ("TTL") signal for detection of transitions.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION

In the following description, numerous specific details are set forth to provide a more thorough understanding of the invention. As will be apparent to those skilled in the art, however, various changes using different configurations may be made without departing from the scope of the invention. In other instances, well-known features have not been described in order to avoid obscuring the invention. Thus, the invention is not considered limited to the particular illustrative embodiments shown in the specification and all such alternate embodiments are intended to be included in the scope of this invention.

For illustrative purposes only, the invention is described with respect to a KAPTON® based scanner flipper; however, that depiction is not intended in any way to limit the scope of the invention. Further, for illustrative purposes, the invention has been described with respect to KAPTON® based scanner models produced by Metrologic, Instruments, Inc. of Blackwood N.J. However, it is appreciated that the invention is not limited to the scanner models disclosed herein. This document incorporates by reference all of the material disclosed within commonly owned and assigned U.S. Pat. No. 6,227,450 issued May 8, 2001 and entitled ELECTRONICALLY-CONTROLLED MECHANICALLY-DAMPED OFF-RESONANT LIGHT BEAM SCANNING MECHANISM AND CODE SYMBOL READERS EMPLOYING THE SAME as if being set forth in its entirety herein.

Figure 1:
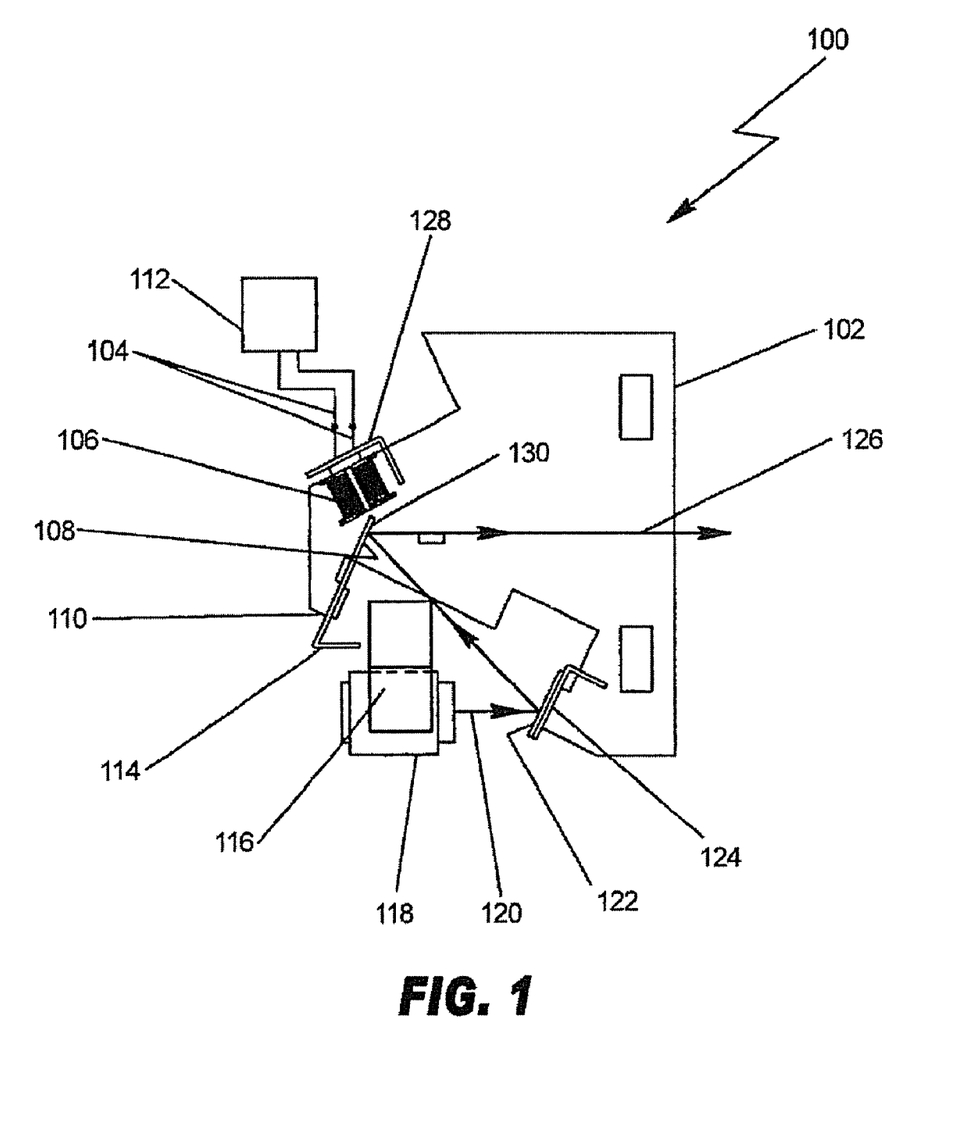
FIG. 1 is a perspective view of an embodiment of an apparatus used in accordance with the invention.
Figure 2:
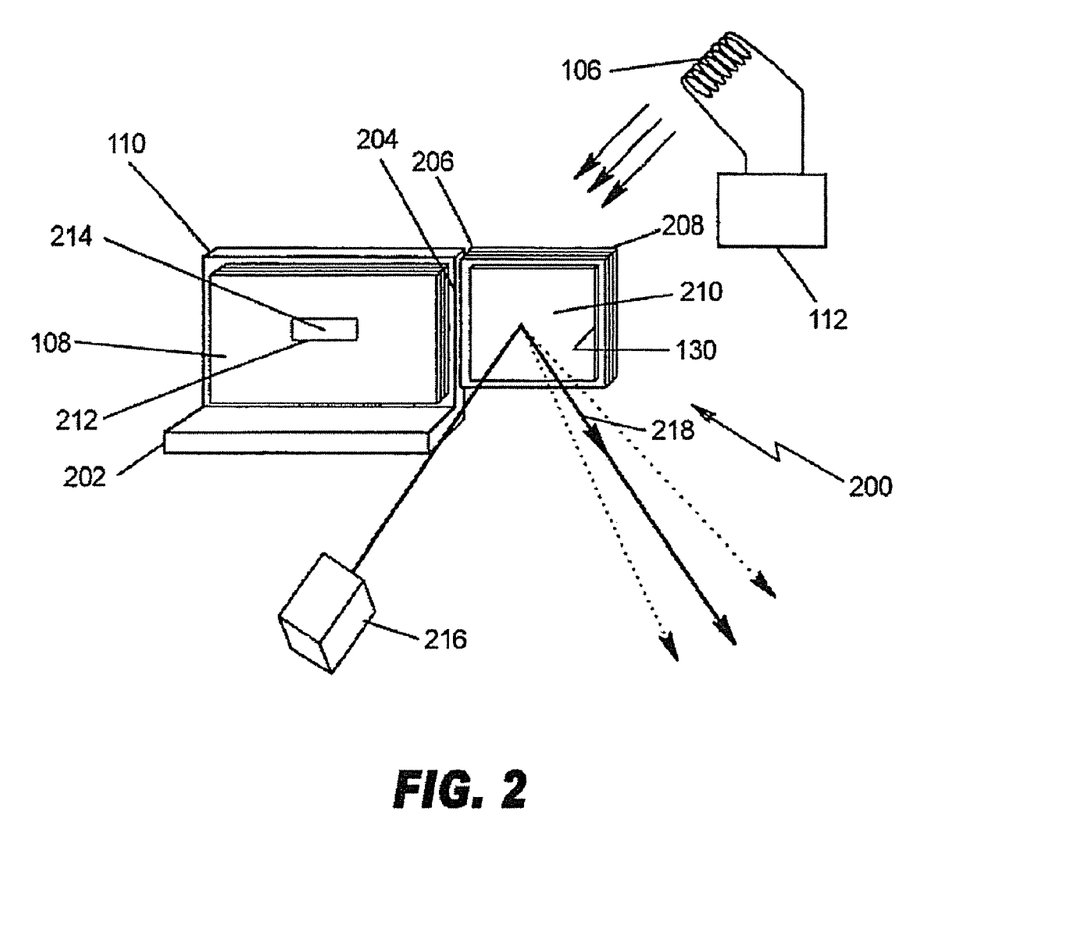
FIG. 2 is a perspective view of a flipper element depicted in FIG. 1.

FIGS. 1 and 2 describe the normal operation of a flipper based scanner. In FIG. 1, a laser beam scanning mechanism of an illustrative embodiment is depicted on an optical bench 102 of planar dimensions. Magnetic-field producing coil (i.e., electromagnetic coil) 106 is supported upon a first projection (e.g., bracket) 128 which extends from the optical bench 102. The scanning element (i.e., the flipper) of the present invention described above is mounted upon a second projection 114 which extends from the optical bench 102. The permanent magnet 208 is placed in close proximity with the magnetic-field producing coil 106, as shown in FIG. 2. A visible laser diode (VLD) 118 is mounted adjacent the scanning element (by way of bracket 116) so that its output laser beam 120 is directed towards a beam folding mirror 122, supported from a third projection (bracket) 124 extending from the optical bench 102. The laser beam reflected off the beam folding mirror 122 is directed towards the laser beam deflecting portion 130 of the scanning element and reflects outwardly along the projection axis 126 of the scanning module. The flipper is forced into oscillatory motion by driving the electromagnetic coil 106 with a voltage signal having a frequency off the resonant frequency of the scanning element (e.g., about 3 to 4 Hz below resonance).

In one embodiment, the electromagnetic coil 106 is driven in a push-pull mode, in which the magnetic polarity of the coil 106 reverses periodically at rate determined by the amplitude variation of the voltage signal applied across the terminals 104 of the electromagnetic coil 106. In the illustrative embodiment, where for example the actual frequency of the flipper determines the scan rate of the laser scanning module. The actual frequency of the scanning mechanism is set by adjusting the frequency of the drive current signal in coil 106. The scanning mechanism of the present invention can be designed to provide scan rates higher than 250 scan lines per second (e.g., by using a thicker polyamide layer and/or narrowing the gap region of the scanning element.

In FIG. 2, the illustrative flipper 200 is shown having a base portion 108 mounted (i.e., anchored) on a support structure 110 of an optical bench 202, and a laser beam deflecting portion 130 extending from the base portion 108, with a flexible gap portion 206 disposed therebetween. As shown, the laser beam deflecting portion 130 bears a light deflecting element 210 on its front surface and a thin permanent magnet element 208 mounted on its rear surface. The light deflecting element 210 can be realized in a number of different ways, namely: as a light reflective element such as a mirror; as a light diffractive element such as a reflection or transmission hologram (i.e., HOE); as a light refractive element such as a lens element; or as any other type of optical element capable of deflecting a laser beam along an optical path as the laser beam deflecting portion 130 is oscillated about a fixed pivot point 204 defined at the interface between the anchored base portion and flexible gap portion of the scanning element. Light deflecting element 210 and magnetic element 208 can be mounted to the scanning element using an adhesive, or other fastening technique (e.g., soldering) well known in the art. In the illustrative embodiments disclosed herein, the laser beam deflecting portion 130 is oscillated about its fixed pivot point by producing a reversible magnetic force field (e.g., of about 260 Gauss) directed against the permanent magnet 8 (e.g., $20/1000$th thick) mounted on the rear surface of the laser beam deflecting portion.

In the illustrative embodiment, the positive polarity of the permanent magnetic field is directed away from the light deflecting element 210 on the laser beam deflecting portion 130. The interaction of magnetic fields of opposite polarity produced by the permanent ferrite-type magnet 208 and a stationary magnetic field producing electromagnet 106 causes the laser beam deflecting portion 130 to oscillate about its fixed pivot point 204 at both its natural resonant frequency of oscillation, its harmonic modes of oscillation, as well as at the driving or forcing frequency at which the polarity of the magnetic force field (produced by electromagnet 106) reverses in response to amplitude variations in the electrical pulse train (driving the electromagnetic coil) which occur at a frequency controlled by an electronic signal generation circuit 112.

Illustratively, the flipper 200 is a KAPTON® flipper which has a laminated construction, wherein: the anchored base portion 108 and the laser beam portion 130, each consist of a thin layer of KAPTON® polyamide sandwiched between a pair of thin layers of copper; and the flexible gap portion 206 consisting of the thin layer of KAPTON® (polyamide) plastic material. Notably, the thin layer of polyamide in the anchored base portion 110, the flexible gap portion 6 and the laser beam deflecting portion 5 is realized as a single unitary layer having a uniform thickness across these individual portions of the scanning element. The copper layers on opposite sides of the anchored base portion, the flexible gap portion and the laser beam deflecting portion of the scanning element are discrete elements of uniform thickness realized by precisely-controlled chemical-etching of the copper and polyamide layers during particular stages of the scanning element fabrication process described below.

Optionally, the flexible gap portion 206 may also include a thin layer of mechanically-damping film material, such as screenable silicone rubber (e.g., General Electric SLA 74015-D1), having a suitable durometer measure, (e.g., Shore A40).

Figure 3:
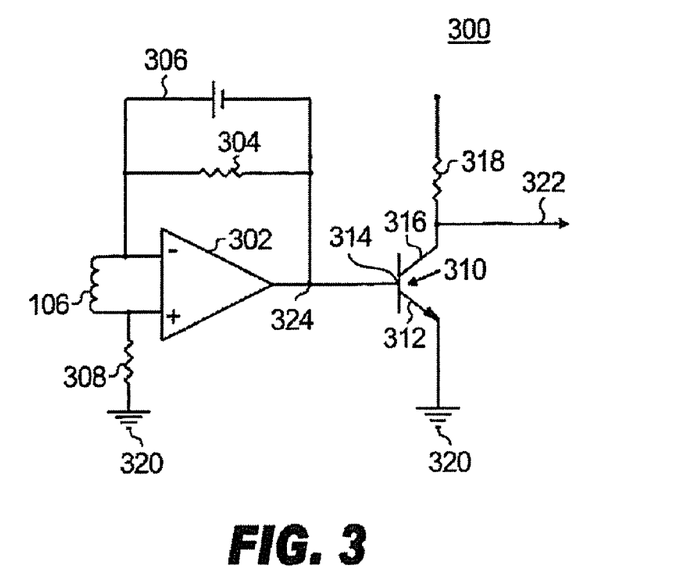
FIG. 3 is a schematic diagram of an embodiment used in accordance with the invention.

FIG. 3 depicts a schematic diagram of an electronic circuit 300 used in accordance with the invention. Electronic circuit 300 includes coil 106; operational amplifier ("op-amp") 302; resistors 304, 308, and 318; a capacitor 306; and a transistor 312. For illustrative purposes values suitable for some of the elements listed above are resistor 304 having a resistance of about 47 kohms; resistor 308 having a resistance of about 4.7 kohms; resistor having a resistance of about 318 is about 10 kohms; capacitor 306 having a capacitance of about 0.001 farads; and transistor 310 can be a transistor type commonly referred to as a "3904."

Coil 106 is couple to op-amp 302. Resister 304 and capacitor 306 are connected in parallel and to the negative terminal of op-amp 302 and to the output of op-amp 302. The connection point of resistor 304 and capacitor 306 to the output of op-amp 302 is hereinafter referred as node 324. Resistor 308 is coupled to the positive terminal of op-amp 302 and to ground 320.

Also connected to node 324 is a base 314 of transistor 310. The emitter 312 of transistor 310 is coupled to ground 320. Resistor 318 is coupled to the collector 316 of transistor 310.

The circuit 300 is used by the exemplary pseudo-code below when either of two events occurs. First, the circuit 300 is used when the scanner 100 is initially turned on; and second, the circuit 300 is used when a "data-sense" error is received.

A data-sense error as used herein is an indication that the flipper is not oscillating as it should. Often a delay occurs between the time that the flipper fails to oscillate and a data-sense error is transmitted (e.g., about 100 ms). When the flipper doesn't oscillate, the laser beam transmitted is a stationary beam and can be hazardous to eyes.

Sometimes an erroneous data-sense error is received. For example, when data is received from the scanner along the optical path the assumption is that the flipper is oscillating and that the laser beam is moving in accordance with the flipper. However, with this method you don't always get data even though the laser beam and flipper are moving. As a result of an erroneous data-sense error, a laser is turned off because of safety concerns based upon an erroneous belief that the flipper was jammed. After a period of time elapsed the laser would be turned back on. If movement of the laser was still not found then the entire scanner would be turned off thinking that the laser was jammed.

Figure 4:
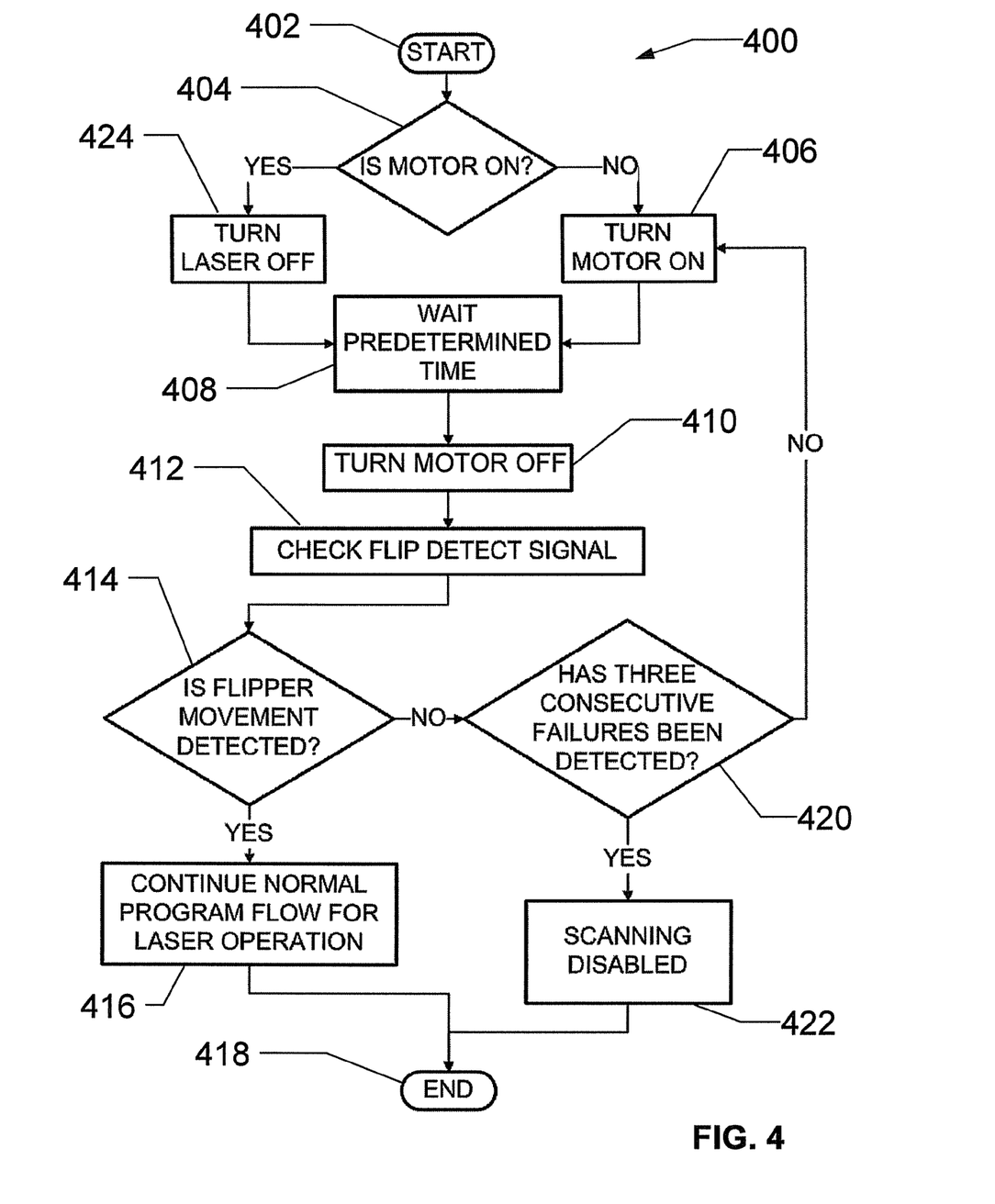
FIG. 4 depicts a method in accordance with the invention.

The circuitry of FIG. 3 in conjunction with a method 400 and pseudo-code described below use the data-sense error to more accurately determine when there is a stationary laser beam do to a lack of movement by the flipper. This lack of movement is not limited to a faulty flipper but can be due to other failure (e.g., the coil 106 is not working properly).

Returning to FIG. 3, when the scanner 100 is scanning and a data-sense error is received the laser is turned off and the circuitry 300 uses the coil 106 as a "sense" coil. In normal scanning operations, the coil 106 is used as a drive coil (i.e., the coil 106 is being driven by a push-pull driver). Because the motor is on even though the laser is off, the voltage generated by the coil 106 moves the magnetic element 208 back and forth.

Op-amp 302 amplifies the wave signal generated by the flipper coil 106 pair. Resistance 304 and capacitance 306 provide the frequency for the amplified wave. The resultant output can be measured at node 324 and can be in different wave forms. For example the wave form at node 324 can be a sine wave, a triangle wave, and a square wave.

The output at node 324 is coupled to the base 314 of the transistor 310 which ultimately is converted to a TTL level signal (i.e., 0 v level and 5 v level) and transmitted along pathway 322 for interpretation. The method 400 described with respect to FIG. 4 and the pseudo-code below use the change (i.e., transition) from either 0 v to 5 v or 5 v to 0 v as indicative of movement of the flipper.

It is appreciated that the flipper configuration (e.g., the components used to make the flipper, the weight of the flipper, and the dimensions of the flipper) can be used to calculate the resonant frequency of the flipper. Further, that the flipper can oscillate at a frequency other than the resonant frequency (e.g., a desired frequency of about 3 to 4 Hz below resonant frequency).

FIG. 4 is an embodiment of a flow diagram of a method 400 in accordance with the invention. The method 400 begins at step 402 and proceeds step 404.

At step 404 a determination is made as to whether the motor is on. If a negative determination is made, the method 400 proceeds to step 406. At step 406 the motor is turned on and proceeds to step 408.

At step 408, the method 400 waits (i.e., leaves the motor on) for a predetermined amount of time (e.g., about 50 ms). The predetermined amount of time is sufficient to power the coil 106 so that the flipper should oscillate at the desired frequency at step 410 (i.e., after the motor is turned off). For example, the predetermined time may be enough time to power the coil 106 so that the flipper is flexed to and held at an angle θ until the method 400 proceeds to step 410. The angle θ can be a minimum angle which will provide enough potential energy in the flipper so that the flipper should oscillate, at step 410, at the desired frequency.

In addition, the predetermined time (e.g., about 50 ms) may also be for a time sufficient to power the coil 106 so that the flipper should oscillate at the desired frequency during steps 408 and 410. It is appreciated that the predetermined time for the motor to be turned on will vary with the power requirements needed to move the flipper.

After the expiration of the predetermined amount time, the method 400 proceeds to step 410 where the motor is turned off. Thereafter, the method 400 proceeds to step 412.

At step 412, the method 400 checks the flip detect signal (i.e., information from steps 406, 408, and 410).

The method 400 proceeds to step 414 and determines whether flipper movement has been detected. If an affirmative determination, at step 414, is made the method 400 proceeds to step 416. An affirmative determination is made when two consecutive transitions are received (as explained above).

The method 400 proceeds to step 416 where the laser is turned on and normal scanner operation is resumed. After scanning is complete, the method 400 proceeds and ends at step 418.

If, at step 414, a negative determination is made, the method 400 proceeds to step 420. A negative determination is made when there is either no transition detected or no consecutive transitions detected. At step 420, a determination is made whether there have been three consecutive failures detected. Step 420 acts as an iterative counter which helps to insure that the method 400 makes several attempts (illustratively, three attempts) to make sure that the flipper, magnet, and coil combination are working improperly before indicating that the 'data-sense" error was accurate.

If a negative determination, at step 420, is made then the method 400 proceeds to step 406. Thus steps 406, 414, and 420 serve as an iterative loop.

If an affirmative determination, at step 420, is made then the method 400 proceeds to step 422. At step 422, scanning is disabled. Thereafter, the method 400 ends at step 418.

If, at step 414 an affirmative determination is made then the method 400 proceeds to step 416. An affirmative determination is made, at step 414, when there have been two consecutive transitions. At step 416, the method 400 enters normal operation mode, turns the laser on, and the scanner scans. After scanning is finished, the method 400 proceeds to and ends at step 418.

If, at step 404 an affirmative determination is made that the motor is on the method 400 proceeds to step 424. At step 424 the laser is turned off and the method 400 proceeds to step 408. The operation of the method 400 proceeds thereafter as described above.

For illustrative purposes an example of pseudo-code for checking whether the flipper is flipping properly is provided:

```
/*************************************************************
****/
/* Check for an active or stuck motor condition */
unsigned char CheckMotor(void)
{
    unsigned char i, count;
    unsigned char checkmotor, motorflip, motorlevel;
    count = checkmotor = 0x00;      /* assume board rev doesn't support this feature */
    motorflip = 0x01;               /* pass this test if detection method not on this board
*/
    switch (ScannerType)
    {
        case MS5145:
            if (BoardType >= G) checkmotor = 0x01;
            break;
        case MS9500:
        default:
            if (BoardType >= H) checkmotor = 0x01;
            break;
    }
    /* check motor if board supports this feature */
    if (checkmotor == 1)
    {
      if (MTRSTAT == 0)
      {
            MOTOR = MotorActive;         /* turn motor back on */
        delay(100);                      /* wait 50 msec */
      }
            MOTOR = !MotorActive;
            MTRSTAT = 0;
            delay(20);                   /* wait 10 msec after turning the motor off */
            FLAG.BIT.bit0 = FlipDetect;
        /* check for flipper movement */
        for (i=0; i<200; i++)            /* check for at least 100 msec */
        {
            delay(1);
            if ((FlipDetect ^ FLAG.BIT.bit0) == 1)
            {
                count += 1;
                if (count >= 2) break;
                FLAG.BIT.bit0 = FlipDetect;
            }
        }
            if (i == 200) motorflip = 0;
    }
    return (motorflip);
}
/*************************************************************
```

The algorithm includes optional pseudo-code which checks for a model of scanner used. Different models will sometimes use different circuit boards. For example, the optional code checks whether the model used is an MS5145 or an MS9500. Each of these models is commercially available from Metrologic Instruments, Inc. of Blackwood N.J. Although included for illustrative purposes, it is appreciated that this optional code is not necessary to practice the invention.

The algorithm checks whether the motor is on; turns the motor on for a time sufficient (e.g., about 50 ms) for the flipping mechanism to reach the desired frequency; waits for a period of time after the motor is turned off (e.g., about 10 ms) to check for transient signal. As explained above with respect to FIG. 3, transistor 310 transmits either a 5 v level or a 0 v level. As explained above, a change from one state to another (i.e., a change in voltage levels) is an indication of a transition. When a transition is initially detected the counter is set and waits for an indication of a consecutive transition. If no initial transition or consecutive transition is detected then the algorithm goes through the process of turning the motor on for a period of time; shutting the motor off; and testing for transitions as described above.

Figure 5:
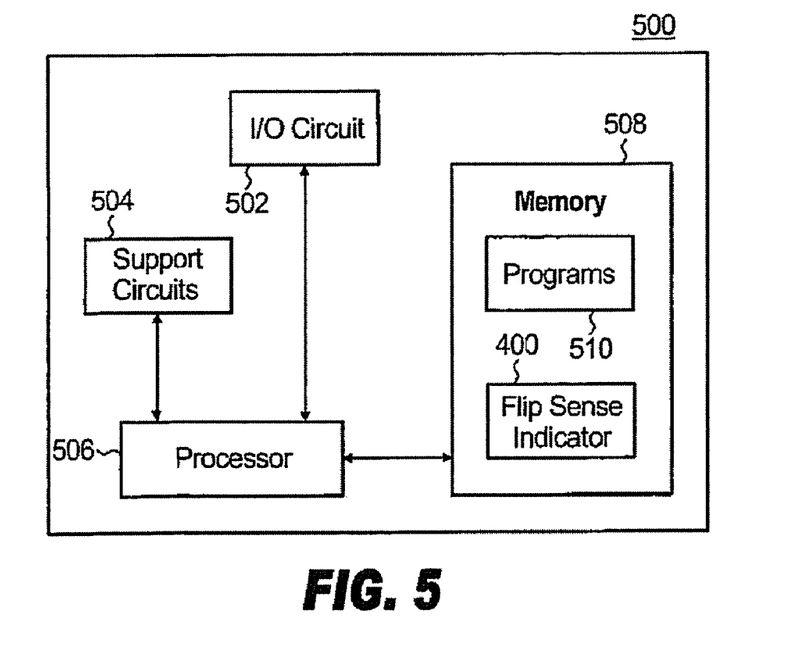
FIG. 5 depicts a high level block diagram of a computer architecture for performing an embodiment of the invention.

FIG. 5 depicts a high level block diagram of an embodiment of a controller 500 as part of the electronic circuitry 112 suitable for use in checking the integrity of the flipper depicted in FIGS. 1 and 2. The controller 500 of FIG. 5 comprises a processor 506 as well as a memory 508 for storing control programs and the like. The processor 506 cooperates with conventional support circuitry 504 such as power supplies, clock circuits, cache memory and the like as well as circuits that assist in executing the software routines stored in the memory 508. As such, it is contemplated that some of the process steps discussed herein as software processes may be implemented within hardware, for example, as circuitry that cooperates with the processor 506 to perform various steps. The controller 500 also contains input-output circuitry 502 that forms an interface between the various functional elements communicating with the controller 500. For example, the controller 500 communicates with the motor, coil, and flipper, as described above, to receive and interpret a voltage signal at TTL level (0 v or 5 v) for determining whether consecutive transitions have occurred.

Although the controller 500 of FIG. 5 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof. For example, the illustrative software algorithm included herein (and as shown and described with respect to FIG. 4) utilize the illustrative circuitry shown and described with respect to FIG. 3.

Although various embodiments that incorporate the teachings of the present invention have been shown and described in detail herein, those skilled in the art can readily devise many other varied embodiments that still incorporate these teachings.

We claim:

1. A method of detecting movement of a flipper by a motor in a scanner, said method comprising the steps of:
   (a) powering said motor for a predetermined amount of time;
   (b) receiving a signal associated with said flipper;
   (c) determining, from said signal, whether there are two consecutive transitions indicative of movement by said flipper; and
   (d) repeating steps (a), (b), and (c) up to two times when a negative determination is made at step (c).

2. The method of claim 1, which further comprises:
   (e) entering normal scanning operation when a positive determination is made at step (c).

3. A method of detecting movement of a flipper by a motor, said method comprising the steps of:
   (a) powering said motor for a predetermined amount of time;
   (b) receiving a signal associated with said flipper;
   (c) determining, from said signal, whether there are two consecutive transitions indicative of movement by said flipper; and
   (d) disabling said flipper when a third consecutive negative determination is made at step (c).

4. The method of claim 1, wherein step (a) comprises:
   (a1) turning on said motor;
   (a2) leaving said motor on for a predetermined time to allow said flipper to oscillate at a desired frequency; and
   (a3) turning off said motor.

5. The method of claim 4, wherein said predetermined time is sufficient to flex and hold said flipper at an angle.

6. The method of claim 1, wherein step (b) comprises:
   (b1) amplifying a magnetically induced voltage signal; and
   (b2) converting said magnetically induced voltage signal to a transistor transistor logic level (TTL) signal.

7. A computer-readable medium having stored thereon a plurality of instructions, said plurality of instructions including instructions which, when executed by a processor, cause said processor to detect movement of a flipper by a motor in a scanner, using a process comprising the steps of:
   (a) powering said motor for a predetermined amount of time;
   (b) receiving a signal associated with said flipper;
   (c) determining, from said signal whether there are two consecutive transitions indicative of movement by said flipper; and
   (d) repeating steps (a), (b), and (c) up to two times when a negative determination is made at step (c).

8. A computer-readable medium having stored thereon a plurality of instructions, said plurality of instructions including instructions which, when executed by a processor, cause said processor to detect the movement of a flipper by a motor in a scanner, using a process comprising the steps of:
   (a) powering said motor for a predetermined amount of time;
   (b) receiving a signal associated with said flipper;
   (c) determining, from said signal whether there are two consecutive transitions indicative of movement by said flipper; and
   (d) entering normal scanning operation when a positive determination is made at step (c).

9. The computer-readable medium of claim 7, which further comprises:
   (e) disabling said scanner when a third consecutive negative determination is made at step (c).

10. The computer-readable medium of claim 7, wherein step (a) comprises:
    (a1) turning on said motor;
    (a2) leaving said motor on for a predetermined time to allow said flipper to oscillate at a desired frequency; and
    (a3) turning off said motor.

11. The computer-readable medium of claim 9, wherein said predetermined time is sufficient to flex and hold said flipper at an angle.

12. The computer-readable medium of claim 7, wherein step (b) comprises:
    (b1) amplifying a magnetically induced voltage signal; and
    (b2) converting said magnetically induced voltage signal to a transistor transistor logic level (TTL) signal.

13. Apparatus comprising:
    a power source for powering a motor in a scanner having a flipper, for a predetermined amount of time;
    a signal processor for receiving a signal associated with said flipper, and determining, from said signal, whether there are two consecutive transitions indicative of movement by said flipper; and
    a controller for initiating said power source, and said signal processor, until at least one of three negative determinations by said signal processor and an affirmative determination occurs by said signal processor.

14. The apparatus of claim 13, wherein said power source comprises:
    circuitry for turning on said motor, and leaving said motor on for a predetermined time to allow said flipper to oscillate at a desired frequency.

15. The apparatus of claim 13, wherein said signal processor comprises:
    an amplifier amplifying a magnetically induced voltage signal; and
    a transistor converting said magnetically induced voltage signal to a transistor transistor logic level (TTL).

16. The apparatus of claim 13, wherein said predetermined time is sufficient to flex and hold said flipper at an angle.

17. The apparatus of claim 13, wherein said controller causes said scanner to enter a normal scanning operation upon a positive determination by said signal processor.

18. The apparatus of claim 13, wherein said controller causes said apparatus to disable said scanner when said three consecutive negative determinations occur by said signal processor.

* * * * *